United States Patent Office 3,004,080
Patented Oct. 10, 1961

3,004,080
CHEMICAL COMPOSITIONS FROM THE CLASS CONSISTING OF 1,4-DIETHYLTETRALIN AND 1,1,4-TRIETHYLTETRALIN
Rex D. Closson, Northville, Mich., Alfred J. Kolka, Pittsburgh, Pa., and Waldo B. Ligett, Pontiac, Mich., assignors to Ethyl Corporation, New York, N.Y., a corporation of Delaware
No Drawing. Filed Apr. 23, 1958, Ser. No. 730,271
3 Claims. (Cl. 260—666)

This invention relates to new compositions of matter and methods of making the same. More particularly, the invention refers to a new class of compounds comprising 1,4-diethyltetralin and 1,1,4-triethyltetralin, wherein said 1 and 4 positions are on the saturated carbon atoms in the tetralin ring which carbon atoms are alpha to a doubly bonded nuclear carbon atom and wherein each alkyl group contains at least two carbon atoms. This is a continuation-in-part of application Serial No. 413,482, filed March 1, 1954, now abandoned.

Cyclodehydration of aromatic alcohols has been employed to make substituted tetralin, (substituted 1,2,3,4-tetrahydronaphthalene), having alkyl groups in the 1 and 2 positions. However, 1,4-diethyl and 1,1,4-triethyltetralin have not been synthesized in the past.

It is an object, therefore, of this invention to provide as new compositions of matter 1,4-diethyltetralin and 1,1,4-triethyltetralin, having new and unexpected properties. Another object is to provide new compounds useful in the synthesis of chemicals which find uses as monomers, plasticizers, polymer and resin components, oxygen acceptors, and other uses.

The above and other objects of our invention are accomplished by the class of compounds comprising tetralins (1,2,3,4-tetrahydronaphthalenes), containing ethyl groups in the 1 and 4 positions and wherein not more than 3 hydrogens in the 1 and 4 positions are replaced by said ethyl groups. More particularly, the objects of our invention are accomplished by 1,4-diethyltetralin and 1,1,4-triethyltetralin.

The compounds of our invention are clear, colorless liquids with a boiling point above 260° C. The compounds of this invention are useful as oxygen acceptors, and in the preparation of monomers, plasticizers, polymer and resin components, polymerization initiators, etc.

The ethyltetralin compounds of this invention are obtained by a process comprising reacting tetralin with ethylene in the presence of a catalyst.

As catalysts in our invention, organo-alkali metal compounds generally, are accepted. This includes organo compounds of sodium, potassium, lithium, cesium and rubidium. We prefer to use organo compounds of alkali metals of atomic weight higher than 7, particularly sodium and potassium. We prefer as catalyst to use hydrocarbo-alkali metal compounds. Illustrative examples include alkyl-alkali metal compounds such as amyl sodium, butyl sodium, hexyl potassium, and the like; aryl-alkali metal compounds such as phenyl sodium, p-tolyl potassium, phenyl lithium, and the like; and alkylaryl-alkali metal compounds such as tetralin sodium, benzyl potassium, benzyl sodium, cumyl sodium, and the like. Mixtures of organo-alkali compounds can be used with equally good results.

In a preferred method of preparing the ethyltetralin of this invention, a catalyst of sodiotetralin is first prepared and then to a solution of tetralin containing the catalyst is added ethylene and the reaction conducted under elevated pressure and temperature. Ethylation of the tetralin occurs in the 1 and 4 positions with no traces of the 2 or 3 alkyltetralins being formed. The product is 1,4-diethyltetralin and 1,1,4-triethyltetralin, the presence and amount of the latter depending on the conditions of the reaction and on the amount of olefin employed. As stated previously, only the 1,4-ethyl-substituted products are formed with no contamination by the 2- or 3-alkyl-substituted products.

The following examples more fully illustrate the preparation of our new compositions of matter.

EXAMPLE I

*Preparation of the catalyst.*—A reaction vessel equipped with means for charging and discharging of liquids and solids, and having a number of gas inlet and outlet lines, temperature reading devices, means for refluxing liquids, and fitted with a mechanical agitator, was flushed with pre-purified nitrogen at elevated temperature in order that all oxygen and moisture be removed from the vessel. To this reaction vessel, while maintaining the flow of nitrogen, was added 23 parts of metallic sodium and 290 parts of tetralin. The flow of nitrogen continued during the following steps. The reaction vessel was next heated until the sodium had melted, at which point the contents were subjected to vigorous agitation until a fine sodium dispersion was obtained. When this was achieved the reaction mixture was allowed to cool to 99° C. at which point the agitation was terminated. When the mixture had cooled to below 60° C. the agitator was again set in motion in order to expedite cooling of the contents.

When the sodium dispersion had reached a temperature of 35° C., vigorous agitation was again applied and 56 parts of chlorobenzene was slowly added to the reaction vessel. As the reaction proceeded, the temperature of the contents was kept in the range of 35 to 40° C. by cooling means. When all of the chlorobenzene had been added and heat of reaction was no longer evolved, the mixture was heated to, and maintained at a temperature in the range of from 105 to 110° C. for one hour with moderate agitation in order that phenyl sodium react with tetralin to form sodiotetralin and benzene. The reaction mixture containing the sodiotetralin was next cooled to about 25° C. at which point it was ready for charging to the autoclave.

*1,4-diethyltetralin.*—A pressure autoclave, having a removable cap for charging and discharging liquids and solids, equipped with a plurality of gas inlet and outlet lines, temperature measuring devices, pressure gauges, and fitted with a mechanical agitator, was flushed with nitrogen and charged with the sodiotetralin catalyst prepared as described above without exposure to the atmosphere. Care was exercised to make certain that there was a continuous flow of nitrogen through the autoclave at the time that the catalyst was being charged to it and also that there was a slow flow of nitrogen into the vessel containing the catalyst during the period of said charging in order that the mixture be not exposed to oxygen at any time. The autoclave was next charged with 1650 parts by weight of tetralin, the autoclave clamped shut and the flow of nitrogen discontinued for the first time in this procedure. The autoclave was then heated to about 130° C. and pressurized to 13–20 atmospheres with ethylene while keeping the temperature at 130° C. As soon as the reaction started (which was indicated by a drop in pressure), the autoclave was further pressurized with ethylene to about 33–40 atmospheres. As the reaction proceeded and the pressure slowly dropped, more ethylene was admitted to keep the pressure at 40 atmospheres. When 162 parts of ethylene had reacted, the heating was discontinued and the autoclave and its contents allowed to cool. When the temperature had reached 25° C., 75 parts of methanol were added in order to decompose any active sodium compounds still left in the mixture. Next, 250 parts of water were added to dissolve any salts present.

The contents were withdrawn from the autoclave and the aqueous layer discarded. The organic layer was dried, subjected to fractional distillation and yielded 858 parts of 1-ethyltetralin and 295 parts of diethyltetralin, the balance being unreacted tetralin and catalyst.

The purified diethyltetralin product was a clear colorless liquid with a refractive index of $n_D^{20}$ 1.52625 and a boiling point of 266.5° C. The carbon and hydrogen analysis showed 89.3 percent C and 10.7 percent H corresponding to a formula of $C_{14}H_{20}$, calculated 89.29 percent C and 10.71 percent H.

The structure was determined by the following method: 10 parts of the diethylated product was heated with 3 parts of sulfur. $H_2S$ evolution began at 190° C. with the majority being evolved at 220° C. to 230° C. After the $H_2S$ evolution had ceased, the temperature of the mixture was increased to 250° C. and was kept at the point for 10 minutes to insure complete reaction. The product was then allowed to cool, placed in a vacuum apparatus and heated up to a temperature of 90–100° C. at a pressure of 1 millimeter of mercury and the volatile material collected at −80° C. The distilled material was heated with 39 parts of ethanol and 8 parts of picric acid. The clear red solution upon cooling yielded orange colored needle-like crystals melting at 90–92° C. Recrystallization from ethanol raised the melting point to 91–92° C. The melting point reported for the picrate of 1,4-diethylnaphthalene is 91–93° C. [Arnold and Barnes, J. Am. Chem. Soc., 66, 960, (1944).]

The above conclusively demonstrated that the diethylated product was 1,4-diethyltetralin. No other diethylated isomer was detected.

EXAMPLE II

The procedure of Example I was followed except that the reaction in the autoclave was carried on for a longer period of time. A total of 1295 parts of tetralin and 244 parts of ethylene were charged to the autoclave. The reaction product was treated in the same manner as in Example I and upon fractional distillation yielded 312 parts of 1-ethyltetralin, 687 parts of 1,4-diethyltetralin and 150 parts of 1,1,4-triethyltetralin. The triethyltetralin was a clear colorless liquid with an index of refraction of $n_D^{20}$ 1.5236, a boiling point of 174° C. at a pressure of 50 millimeters of mercury, and a carbon and hydrogen analysis of 88.9 percent C and 11.2 percent H, calculated 88.9 percent C and 11.1 percent H.

EXAMPLE III

A sample of 1,4-diethyltetralin prepared as in Example I was emulsified with 2.5 percent aqueous sodium carbonate and was hydroperoxidized at 90° C. with molecular oxygen. The crude reaction mixture was purified by dissolving in hot toluene. On cooling, diethyltetralin dihydroperoxide precipitated in 22 percent yield.

Catechol was prepared from diethyltetralin dihydroperoxide in 42 percent yield by cleavage with an alkane sulfonic acid catalyst in acid solution. Catechol is recovered by replacing the acetone with benzene and then extracting the benzene solution with water. Catechol is extracted into the water phase. It may be recovered by extraction with an organic solvent and identified by comparison with an authentic sample prepared by an independent route.

One of the uses of the new compounds of this invention is their ability to take up oxygen and form hydroperoxide products. It has also been found, that 1,4-diethyltetralin and 1,1,4-triethyltetralin take up oxygen at a much faster rate than corresponding 1-alkyltetralin. To illustrate the variation in the rate of oxidation to the hydroperoxidized products of tetralin and the various ethyl substituted tetralins, oxygen was slowly passed through each of the compounds in question and samples were withdrawn at regular intervals of time and an analysis made in order to determine the amount of hydroperoxide product formed.

Table I summarizes the results. In each experiment, an emulsion of the ethyltetralin compound in water formed with the aid of a minor amount of sodium stearate was kept at a temperature of 90° C. while oxygen was slowly passed through. The rate of flow of oxygen was the same for each compound shown in the table.

*Table I*

HYDROPEROXIDATION RESULTS

| Compound Used | Wt. Comp'd, g. | Vol. $H_2O$ (ml.) | Percent Hydroperoxide Formed In | | | |
|---|---|---|---|---|---|---|
| | | | 3 hrs. | 6 hrs. | 9 hrs. | 12 hrs. |
| Tetralin | 20 | 40 | (1) | 4.0 | | |
| 1-Ethyltetralin | 20 | 40 | 0 | 6.6 | | |
| 1,4-Diethyltetralin | 17.5 | 40 | 7.5 | 18.5 | 35.0 | 43.0 |
| 1,1,4-Triethyltetralin | 20 | 40 | | 4.2 | | |

1 0.2 in 2 hrs.

It will be noted that 1-ethyltetralin yielded no hydroperoxide product at the end of three hours of oxidation while 1,4-diethyltetralin oxidized to an extent equivalent to 7.5 percent monohydroperoxide product of the 1,4-diethyltetralin originally present in an equal interval of time under similar conditions. Furthermore, at the end of six hours of oxidation, the 1,4-diethyltetralin had formed 180 percent more hydroperoxidized product than 1-ethyltetralin. This illustrates the greatly enhanced and unexpected susceptibility of the 1,4-diethyltetralin of this invention to oxidation or oxygen uptake. The advantageous rate of oxygen uptake and ability to lead to valuable end-products such as catechol, is not shared by other isomeric diethyltetralins. In comparing the rate of hydroperoxidation of 1,1,4-triethyltetralin to that of 1-ethyltetralin, it is found, upon taking into consideration the fact that 1-ethyltetralin has three hydrogens on the carbon atoms alpha to the nuclear bond, which is susceptible to hydroperoxidation while 1,1,4-triethyltetralin has only one hydrogen on such alpha carbon atom, that the rate of hydroperoxidation of the latter is about twice as fast as that of 1-ethyltetralin. This further illustrates the unexpected oxygen accepting properties of the compounds of this invention.

It is seen, therefore, that one of the uses of the compounds of the present invention is in the role of oxygen acceptors. They can also be used in the synthesis of other products, such as 1,4-diethylnaphthalene, 1,4-dicarboxylnaphthoic acid, 1,4-divinylnaphthalene, 1,4-dihydroxynaphthalene, and the like. The hydroperoxidized product obtained by the oxidation of 1,4-diethyltetralin can be used to synthesize catechol. In each of these cases the product consists of but one isomer and thus eliminates the costly and time consuming steps often found necessary in order to separate the desired product from closely related isomers when using other processes. This illustrates the decided advantage of employing the compounds of our invention as starting materials in the synthesis of the above mentioned compounds.

In the commercial production of the compounds of our invention it is particularly attractive to conduct the process in a continuous manner. This can be done by a variety of techniques such as passing the reactants together with the catalyst, either substantially pure or admixed with an inert carrier, through a reaction zone. The product stream can be purified by distillation in a continuous fractionation column. The continuous method for the production of the compounds of our invention can be carried out either in a "once through" manner or with recycling of reactants and products. In continuous and batch modifications of our invention, the reactants can be diluted with inert gases such as propane, ethane, methane, nitrogen, helium, neon, and the like.

We claim:
1. A compound selected from the class consisting of 1,4-diethyltetralin and 1,1,4-triethyltetralin.
2. 1,4-diethyltetralin.
3. 1,1,4-triethyltetralin.

References Cited in the file of this patent

UNITED STATES PATENTS

| | | |
|---|---|---|
| 2,721,886 | Pines et al. | Oct. 25, 1955 |
| 2,728,802 | Closson et al. | Dec. 27, 1955 |

OTHER REFERENCES

Fleischer et al.: Berichte, vol. 53B, pp. 1255–61 (1920); abstracted in Chemical Abstracts, vol. 14, p. 36622 (1920).

Arnold et al.: Journal of the American Chemical Society, vol. 66 (1944), pp. 960–964 relied on.

Egloff: "Physical Constants of Hydrocarbons," vol. IV, p. 41, Reinhold Publishing Corp., New York (1947).

Sisido et al.: Journal of the American Chemical Society, vol. 70, pp. 1288–9 (1948), p. 1288 relied on.

Cocket et al.: Journal of the Chemical Society (1953), pp. 2355–62, abstracted in Chemical Abstracts, vol. 48 (1954), p. 9986B.